United States Patent Office 3,389,647
Patented June 25, 1968

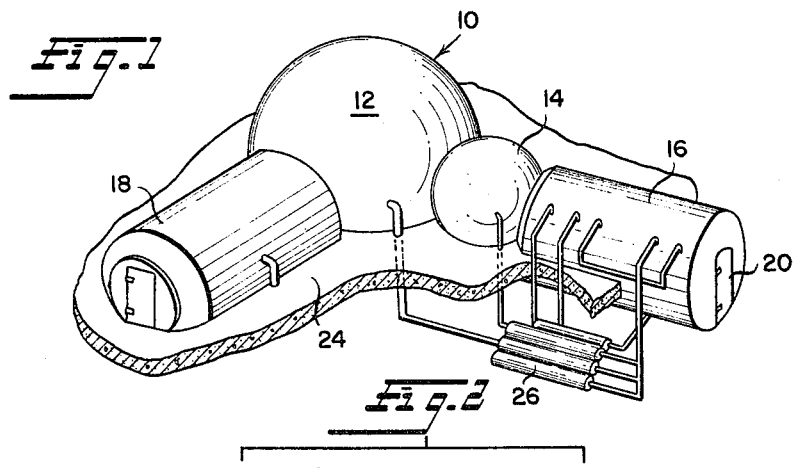
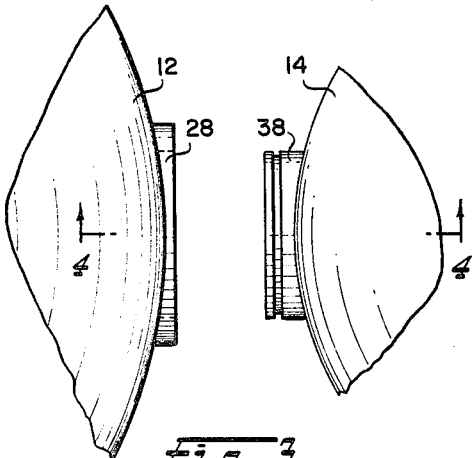
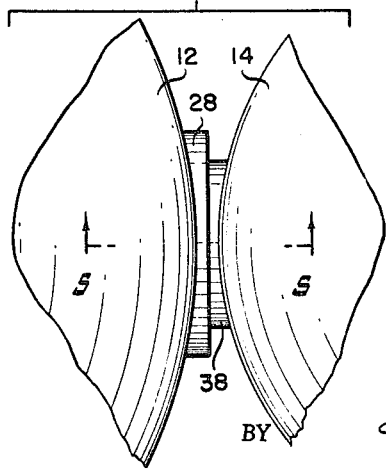

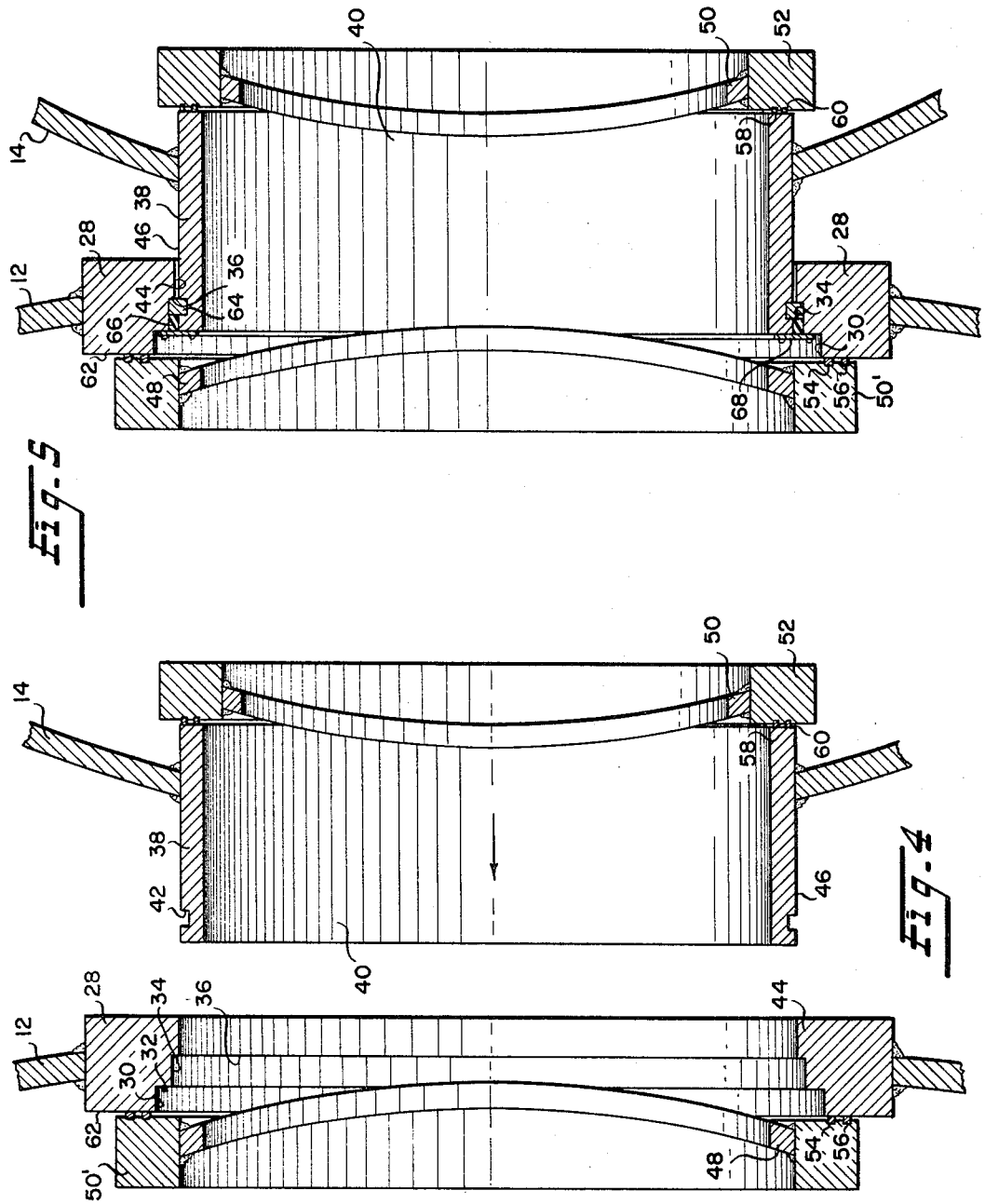

---

3,389,647
HYPERBARIC APPARATUS AND JOINT
CONNECTION MEANS THEREFOR
Russell C. Wolfe, Baltimore, Md., assignor to Dixie
Manufacturing Company, Inc., Baltimore, Md., a
corporation of Maryland
Filed Oct. 22, 1965, Ser. No. 501,006
7 Claims. (Cl. 98—1.5)

ABSTRACT OF THE DISCLOSURE

The invention relates to a hyperbaric apparatus in which surgery can be performed under conditions above atmospheric conditions. The apparatus comprises a plurality of completely airtight vessels or chambers or large diameter so that personnel can work and perform surgery therein. The vessels are provided with interconnecting openings in which one opening is provided by a flange and another opening is provided by a sleeve which telescopes into the flange. A metal ring is provided for insertion through the flange member into a recess in the sleeve member and means are provided for supplying air under pressure, which is above atmospheric pressure, so as to provide a fluid-tight seal between the vessels and to eliminate the necessity for using a bolt and flange method of connecting the two members.

---

The present invention relates to a hyperbaric apparatus and more particularly to such an apparatus provided with means for forming a fluid tight seal or joint therefor.

In accordance with the present invention, a hyperbaric chamber or chambers is provided in which the interior of the chamber is at a pressure above atmospheric pressure, and said chamber is provided with ingress or egress means and further means are provided for preventing the leakage of fluid from the interior of the chamber.

It is an object of the present invention to provide a pressure chamber that can be utilized for many purposes and can be used for medical, as well as for other purposes.

It is another object of the present invention to provide pressurized chambers in which means are provided for utilizing the fluid pressure interiorly of the chambers to provide a seal across joint means by which the chambers are attached or connected to each other.

It is another object of the present invention to provide a joint connection for two separate members in which the joint is provided by utilizing split ring means with a resilient gasket and fluid pressure means acting on the gasket so as to provide a fluid tight seal around the split ring means.

It is another object of the present invention to provide a method of joining two separate members together by telescoping one member within the other member and thereafter applying locking means between the members and a resilient gasket member to prevent any leakage of fluid around the locking means.

It is yet another object of the present invention to provide a locking means or a joint means for detachably connecting two separate members to each other without utilizing the conventional flange and bolt members used heretofore.

It is yet another object of the present invention to provide an apparatus including at least two pressure vessels or chambers that can be detachably connected to one another by using a split ring member and a gasket member in which the vessels are filled with a fluid so as to have their interiors maintained above atmospheric pressure and to utilize the fluid pressure to provide a seal around the portion of the vessels at their points of attachment.

It is another object of the present invention to provide a pressurized vessel that can be readily attached to another pressurized vessel, and both vessels have a simple and economical joint connection therebetween, and which joint connection can be quickly completed so that the pressure chambers can be utilized either in subatmospheric conditions, such as in outer space, or under conditions wherein the pressure is substantially above that of sea level, such as in underwater and diving operations, as well as being utilized on the surface of the earth under the usual atmospheric conditions.

Various other objects and advantages of the present invention will be readily apparent from the following detailed description when considered in connection with the accompanying drawings forming a part thereof and in which:

FIGURE 1 is a perspective view of a hyperbaric chamber assembly illustrating the utilization of the joint connection embodied in the present invention.

FIGURE 2 is an enlarged fragmentary view illustrating a portion of two pressure vessels before they are joined together in a fluid tight connection.

FIGURE 3 is a view similar to FIGURE 2 but illustrating the two pressure vessels after they have been positioned in a telescoping relationship so that the joint means can be properly attached.

FIGURE 4 is an enlarged detail view taken along the line 4—4 of FIGURE 2 illustrating the method of detachably connecting the two pressure vessels to each other, and in a condition before they are actually joined, and FIGURE 5 is a section on an enlarged scale along line 5—5 illustrating the two pressure vessels and the joint connection in which the vessels are secured to one another.

Referring to the drawings, the reference numeral 10 generally designates a hyperbaric assembly which for purposes of illustrating the invention is shown to comprise a medical application, although it is realized the invention is not to be limited to this specific application of the invention illustrated herein. The assembly is provided with a hemispherical surgical chamber 12 and a diagnostic lock 14 and a diagnostic chamber 16 and a therapeutic chamber 18. The diagnostic chamber is substantially cylindrical in shape and is provided with an inlet or ingress door 20 while the therapeutic chamber is provided with an exit door.

Referring to FIGURE 1, it will be noted that the diagnostic chamber is an elongated cylinder while the diagnostic lock 14 is a sphere approximately 10 feet in diameter. The surgical chamber is also a sphere and the therapeutic chamber is of cylindrical shape. It will also be noted that the particular application illustrates the chambers being supported on and extending through a support or floor 24. The chambers and diagnostic lock are connected with an air storage system 26 which may be compressed air or, if desired, may be oxygen enriched or the like.

Referring to FIGURES 2 and 4, the invention will be illustrated with respect to the locking or joining together of the surgical chamber 12 and the diagnostic lock 14, although it is realized that the same lock exists between the diagnostic chamber and the diagnostic lock, and also between the surgical chamber and the therapeutic chamber. The surgical chamber 12 is provided with an opening in the side thereof adjacent the lock 14 and a flange 28 is welded around the opening in the sphere. The flange 28 is substantially square in cross-section and has a groove or recess 30 cut out of its inner surface or priphery so as to form a shoulder 32. The flange 28 is also provided with a second groove inwardly of the first groove 30 of smaller diameter than the first groove 30 which provides a shoulder 36 adjacent the inner surface of the flange.

The sphere 14 is provided with as leeve member 38 that is welded to an opening as indicated at 40 in the side of the sphere. The sleeve 38 has a portion extending inwardly of the inside diameter of the sphere and a longer portion extending substantially beyond the outer surface of the sphere 14 as best seen in FIGURES 4 and 5. The outer end of the sleeve 38 is provided with an annular groove or recess 42 which is rectangular shape in cross-section. The inner diameter of the flange 28 as indicated at 44 is substantially larger than the outer diameter as indicated at 46 of the sleeve 38 so that the sleeve 38 can be telescoped within and slide within the flange 28.

The surgical chamber sphere is provided with a manhole cover 48 while the sphere 14 is also provided with a manhole cover 50. The manhole covers 48 and 50 are provided with square flanges 50′ and 52 respectively which are welded to the circular cover. And the cover 48 is provided with two circumferential sealings rings 54 and 56, while the cover 50 is provided with similar rings 58 and 60 for providing a fluid tight seal between their respective flanges and the flange 28 and the sleeve 38 of the respective spheres. The manhole covers are hingedly connected to open and close over the openings in the sphere by any well known means, not shown.

When it is desired to connect the sphere 12 to the sphere 14 so as to form a fluid tight connection or joint therebetween, the spheres are moved into the position shown in FIGURES 2 and 4, at which time it will be noted that the sleeve 38 is positioned so that it can be readily telescoped within the flange 28 by moving its outer end into the inside diameter formed by the diameter 44. The sleeve 38 is moved within the interior of the sphere 12 so that the circumferential recess 42 in the sleeve extends beyond the inner surface 62 of the flange 28. At this time the sleeve 38 is moved in a direction as indicated in the arrow in FIGURE 4 until groove 42 completely clears the inner surface 62 of the flange 28. Thereafter, a metal split ring 64 of well known construction and of substantially square cross section is inserted within the recess 42 while the sleeve is maintained in this position inwardly of the flange 28. Thereafter, the flange 38 is moved in a direction opposite to the arrows shown in FIGURE 4, or to the right, until the split ring moves into the recess 34 in the flange 28, and until the split ring 64 abuts against the shoulder 36, as best seen in FIGURE 5.

It will be noted that the outer diameter of the split ring 64 is substantially less than the diameter of the recess 34 so that the ring can fit therein. After the ring is thus positioned, a rectangular gasket member 66 is inserted or forced between the sleeve 38 and the recess 34, with the gasket member 66 abutting the split ring 64 as best shown in FIGURE 5. A thin annular plate 68 is then secured to the outer surface of the sleeve 38 and the shoulder 32 by bolts or other suitable means so as to secure the gasket 66 in place.

The provision of the resilient gasket 66, which is preferably of rubber material, against the split ring 64 and the above atmospheric pressure that is maintained in the chambers forces the gasket 66 into a tight sealing relationship with the split ring 64 so as to provide a fluid tight joint between the chambers. Thus the provision of the split ring within the recess of the sleeve 38 and the telescopic arrangement of the sleeve 38 with the flange 28 enables the two pressure chambers to be quickly detachably secured to each other without the requirement of the large bolts and gasket means used heretofore.

If desired the gasket 66 may be T-shaped and the small screws may be eliminated in holding the gasket in place, since the fluid pressure within the hyperbaric chambers will cause the sealing gasket to remain in place.

When it is desired to separate the chambers, it is only necessary to again move the sphere 14 in the direction indicated by the arrow in FIGURE 4 until the split ring 64 is spaced inwardly of the inner surface 62 of the flange 28 after which it can be readily removed from its recess, and the sleeve 38 can be moved or slid to the right so as to be completely removed from the interior of the sphere and the spheres can be used independently of each other.

From the foregoing description it is apparent that the present invention provides a novel joint connection for locking two independent steel shells together without the use of a conventional bolted flange connection, and which utilizes the pressure of the interior of the chambers to prevent any leakage of fluid or air out of the interior of the chambers.

It is apparent that the present invention provides a simple and quick joint connection or coupling assembly for connecting and disconnecting two pressurized chambers, whether they be under atmospheric conditions, or under water, such as in diving and salvage or sea exploration applications, and which can further be used in subatmospheric or vacuum conditions, such as in space exploration.

Inasmuch as various changes may be made in the form, location and relative arrangement of the several parts, and in the method of locking the portions together, without departing from the essential characteristics of the invention, it will be understood that the invention is not meant to be limited except by the scope of the appended claims.

What is claimed is:

1. A hyperbaric apparatus for performing surgery and the like under pressure above atmospheric comprising a first large enclosed chamber and a second large enclosed chamber, said first chamber having a circular flange welded thereto with stepped shoulders disposed on the inner circumference of said flange and forming an opening therein, said second chamber having a sleeve welded thereto, forming an opening and projecting outwardly of said second chamber with a circumferential recess on the outer circumference of said sleeve on said outwardly projecting part, a ring disposed in said recess of greater cross-sectional dimension than said recess, said sleeve extending into said flange, said ring projecting out of said recess and abutting one of said stepped shoulders, and flange having another stepped shoulder disposed inwardly of said first method stepped shoulder, and means for supplying air above atmospheric pressure to the interior of said chambers to form a surgical assembly.

2. The vessels of claim 1 wherein said chambers are of spherical configuration.

3. The vessels of claim 1 wherein said chambers are of cylindrical and spherical configuration.

4. The chambers of claim 1 wherein a resilient gasket member is disposed between the outside diameter of said sleeve and the surface of said recess and abuts against said ring.

5. A method of detachably connecting two pressure vessels together to form a fluid tight seal therebetween comprising taking a first pressure vessel with a flanged opening and an internal recess therein, and a second pressure vessel with a sleeve projecting out of it with a recess in its outer circumference, and telescoping said sleeve within said flanged opening until the recess clears its inner side edge, thereafter inserting a split ring in the sleeve recess and sliding said sleeve in a direction outwardly of said opening until said ring engages the flange recess.

6. The method of claim 5 including the step of inserting a resilient gasket between said sleeve and flange until it abuts said ring.

7. The method of claim 6 including the step of injecting a fluid above atmospseric pressure into one of said vessels to act against said gasket.

References Cited

UNITED STATES PATENTS

| | | | |
|---|---|---|---|
| 2,877,732 | 3/1959 | Eaton | 285—321 |
| 3,191,974 | 6/1965 | Mann et al. | 285—321 |
| 3,272,538 | 9/1966 | Bergstrom | 285—321 |

MEYER PERLIN, *Primary Examiner.*

CARL W. TOMLIN, *Examiner.*

W. L. SHEDD, *Assistant Examiner.*